United States Patent
Chamberlin et al.

(10) Patent No.: US 8,976,225 B2
(45) Date of Patent: Mar. 10, 2015

(54) METHOD, COMPUTER PROGRAM AND DEVICE FOR MANAGING MEDIA STREAM IN VIDEO CONFERENCING

(71) Applicant: Pexip AS, Lysaker (NO)

(72) Inventors: Giles Russell Chamberlin, Oxfordshire (GB); Hani Mustafa Elsayed Abdelkader Hashim, Oslo (NO); Nicolas Jean Michel Cormier, Oslo (NO); John-Mark Bell, Reading (GB); Eoin Stuart McLeod, Reading (GB); Benjamin John Hockley, Reading (GB)

(73) Assignee: Pexip AS, Lysaker (NO)

( * ) Notice: Subject to any disclaimer, the term of this patent is extended or adjusted under 35 U.S.C. 154(b) by 26 days.

(21) Appl. No.: 13/945,347

(22) Filed: Jul. 18, 2013

(65) Prior Publication Data

US 2014/0176666 A1 Jun. 26, 2014

Related U.S. Application Data

(60) Provisional application No. 61/746,251, filed on Dec. 27, 2012.

(30) Foreign Application Priority Data

Dec. 21, 2012 (NO) .................................. 20121568

(51) Int. Cl.
*H04N 7/15* (2006.01)
*H04L 12/18* (2006.01)
*H04M 3/56* (2006.01)

(52) U.S. Cl.
CPC ............ *H04N 7/152* (2013.01); *H04L 12/1822* (2013.01); *H04M 3/563* (2013.01); *H04M 3/565* (2013.01); *H04M 3/567* (2013.01); *H04M 2201/50* (2013.01)
USPC ...................................................... 348/14.09

(58) Field of Classification Search
CPC .... H04L 12/1822; H04M 3/567; H04N 7/152
USPC .............................................. 348/14.09, 14.08
See application file for complete search history.

(56) References Cited

U.S. PATENT DOCUMENTS

| | | | |
|---|---|---|---|
| 7,007,098 B1 | 2/2006 | Smyth et al. | |
| 8,791,982 B1* | 7/2014 | Ellner | 348/14.1 |
| 2008/0165245 A1 | 7/2008 | Sarkar et al. | |
| 2009/0167841 A1 | 7/2009 | Wu et al. | |
| 2011/0141221 A1* | 6/2011 | Satterlee et al. | 348/14.08 |
| 2012/0300017 A1 | 11/2012 | Li et al. | |
| 2013/0250037 A1* | 9/2013 | Cipolli et al. | 348/14.09 |

OTHER PUBLICATIONS

Norwegian Search Report dated Jun. 13, 2013 for Norwegian Application No. 20121568, filed on Dec. 21, 2012 consisting of 2 pages.

* cited by examiner

*Primary Examiner* — Stella Woo
(74) *Attorney, Agent, or Firm* — Christopher & Weisberg, P.A.

(57) ABSTRACT

A method for managing media streams including at least video data and audio data in a multi-party video conference involving one or more groups of one or more nodes respectively receiving a media stream from each of a plurality of associated endpoints is provided. In each of the one or more nodes of each of the one or more groups, the loudest audio of the media streams received from the respective plurality of associated endpoints is determined. An indication of the volume of the determined loudest audio and an identification of the node is transmitted to a decision maker. The highest received volume and the associated identification is determined. The node of the identification is instructed to transmit the received media stream of the endpoint to one of: all nodes in the one or more groups and to a proxy.

12 Claims, 4 Drawing Sheets

METHOD, COMPUTER PROGRAM AND DEVICE FOR MANAGING MEDIA STREAM IN VIDEO CONFERENCING

CROSS-REFERENCE TO RELATED APPLICATION

This application is: related to and claims priority to U.S. Provisional Patent Application Ser. No. 61/746251, filed Dec. 27, 2012, entitled DECISION TREE and Norwegian Patent Application No. 20121568 filed Dec. 21, 2012 entitled METHOD, COMPUTER PROGRAM AND DEVICE FOR MANAGING MEDIA STREAM IN VIDEO CONFERENCING, the entirety of both of which are incorporated herein by reference.

TECHNICAL FIELD

The present invention relates to a method, computer program and a system to continuously provide a view of the loudest speaker or speakers in a video conference.

BACKGROUND

Transmission of moving pictures in real-time is employed in several applications like e.g. video conferencing, net meetings and video telephony.

Video conferencing systems allow for simultaneous exchange of audio, video and data information among multiple conferencing sites. Systems known as Multipoint Control Units (MCUs) perform switching functions to allow the endpoints of multiple sites to intercommunicate in a conference. The MCU links the sites together by receiving frames of conference signals from the sites, processing the received signals, and retransmitting the processed signals to appropriate sites. The conference signals include audio, video, data and control information. In a switched conference, the video signal from one of the conference sites, typically that of the loudest speaker, is broadcast to each of the participants. In a continuous presence conference, video signals from two or more sites are spatially mixed to form a composite video signal for viewing by conference participants. When the different video streams have been mixed together into one single video stream, the composed video stream is transmitted to the different parties of the video conference, where each transmitted video stream preferably follows a set scheme indicating who will receive what video stream. In general, the different users prefer to receive different video streams. The continuous presence or composite image is a combined picture that may include live video streams, still images, menus or other visual images from participants in the conference.

As indicated above a number of endpoints using a multi-stream approach each may be sending its audio to all other endpoints and, if it is nominated as a "loudest speaker", also sends its video. The video of the loudest speaker is either viewed alone, or as the largest view on the screen.

Voice switched is typically used to describe a conference where only one speaker is visible at any time. Continuous Presence refers to those where many speakers are visible, sometimes with the active speaker emphasised. Active presence is always the latter case A similar situation would occur in a distributed MCU with multiple virtual endpoints mixing audio and video which is transmitted over the back plane. The MCU is in this case distributed across multiple physical chassis. The software architecture is arranged such that instead of using a back plane to communicate between the components, the Ethernet network whether LAN or WAN, is used. In the following description, endpoints are referred to both real endpoints and virtual endpoints. A virtual endpoint may be a unit representing a real endpoint in an infrastructure component like an MCU. The MCU consider the virtual endpoint to be the real endpoint, and exchanges all data to the virtual endpoint instead of the real endpoint. The virtual endpoint possibly formats and forward the data to the real endpoint. Data transmitted from the real endpoint to the MCU would be similarly treated via the virtual endpoint.

In certain scenarios, as a new speaker starts, an endpoint may switch very rapidly so as the first syllable is lost.

SUMMARY

An object of embodiments herein is to overcome or at least alleviate the above mentioned disadvantage. This object and other objects are achieved by the independent claims enclosed herewith.

According to an aspect, there is provided a method for managing media streams comprising at least video data and audio data in a multi-party video conference. The video conference involves one or more groups of one or more nodes respectively receiving a media stream from each of a plurality of associated endpoints. As an example, the endpoint may be associated to a respective node. In each of the one or more nodes of each of the one or more groups, the loudest audio of the media streams received from the respective plurality of associated endpoints is determined. Further, each of the one or more nodes of the respective one or more groups transmits an indication of the volume of the determined loudest audio and an identification of the node associated with the loudest audio to a respective decision maker associated with each one or more groups. In each one or more decision maker, the highest received volume and the associated identification is determined. Next, a descicion maker instructs the node of the identification corresponding to the highest determined volume to transmit the received media stream of the endpoint associated with the determined loudest audio to all nodes in the one or more groups, or to a respective proxy associated with each of the one or more groups.

Each decision maker respectively may be associated with the one or more groups being assigned to a level of a number of levels in a hierarchy tree structure in which the decision makers are arranged.

In some embodiments, the method further comprises transmitting from each one or more decision maker not being assigned to the highest level of the number of levels an indication of the respective highest determined volume and the respective associated identification to the decision maker at the next level in the hierarchical tree structure.

The decision maker, in the step of instructing, may be assigned to the highest level in the number of levels in the hierarchical tree structure.

A node, e.g. some of the one or more nodes, may be a virtual endpoint, a multimedia server, an MCU, or a sub-units in a distributed MCU.

A node, e.g. some of the one or more nodes, may be a sub-unit in a distributed MCU further transmitting the received media stream of the endpoint associated with the determined loudest audio to all of its associated plurality of endpoints.

According to another aspect, there is provided a computer implemented decision maker for managing media streams comprising at least video data and audio data in a multi-party video conference involving one or more groups of one or more nodes respectively receiving a media stream from each of a plurality of associated endpoints. The decision maker comprises a receiving means, adjusted to receive, from each of the one or more nodes of the respective one or more groups, an indication of the volume of the respectively determined loudest audio and an identification of the respective node associated with the loudest audio in the one or more nodes of the respective one or more groups. Furthermore, the decision maker comprises a determining means adjusted to determine the highest received volume and the associated identification. Moreover, the decision maker comprises an instruction means adjusted to instruct the node of the identification corresponding to the highest determined volume to transmit the received media stream of the endpoint associated with the determined loudest audio to all nodes in the one or more groups, or to a respective proxy associated with each of the one or more groups.

The decision maker may be assigned, e.g. configured to be assigned, to a level of a number of levels in a hierarchy tree structure in which a plurality of decision makers respectively associated with the one or more group are arranged.

In some embodiments, the decision maker further comprises a transmission means adjusted to transmit an indication of the respective highest determined volume and the respective associated identification to another decision maker at the next level in the hierarchical tree structure.

The decision maker may be assigned to the highest level in the hierarchical tree structure.

A node, e.g. some of the one or more nodes, may be a virtual endpoint, a multimedia server, an MCU, or a sub-units in a distributed MCU.

A node, e.g. some of the one or more nodes, may be a sub-unit in a distributed MCU further adjusted to transmit the received media stream of the endpoint associated with the determined loudest audio to all of its associated plurality of endpoints.

DETAILED DESCRIPTION OF AN EXAMPLE EMBODIMENT

According to embodiments herein, it is desirable that, as a new speaker starts, and endpoint can switch that speaker very quickly so as the first syllable is not lost. It is therefore desirable that all endpoints transmit their audio to all other endpoints at all times, so that should they become an active speaker they may be mixed in with the least possible delay. In the case of the MCU a simplification can be made with a local decision on each node as to which media streams are possible mix candidates and hence should be forwarded.

A decision needs to be made as to which media streams should be added to an endpoint's mix as the loudest speaker.

The inventors have realized two potential solutions of the problem discussed above—local or central decision making. In the local decision case, each endpoint receives audio from each of the other endpoints. A local decision is then made as to which are the N loudest audio streams and should be added to the mix. A simplification can be made in the MCU case where each node transmits its N loudest streams to all other nodes, dropping all other streams. The denotation "node" and "sub-nodes" as used herein, includes all devices being able to participate in a video conference such as endpoints, virtual endpoints, multimedia servers, MCUs, sub-units in a distributed MCU etc. However, a node as presented in the following discussions will manage a number of sub-nodes or endpoints at a local site.

Figure 1:
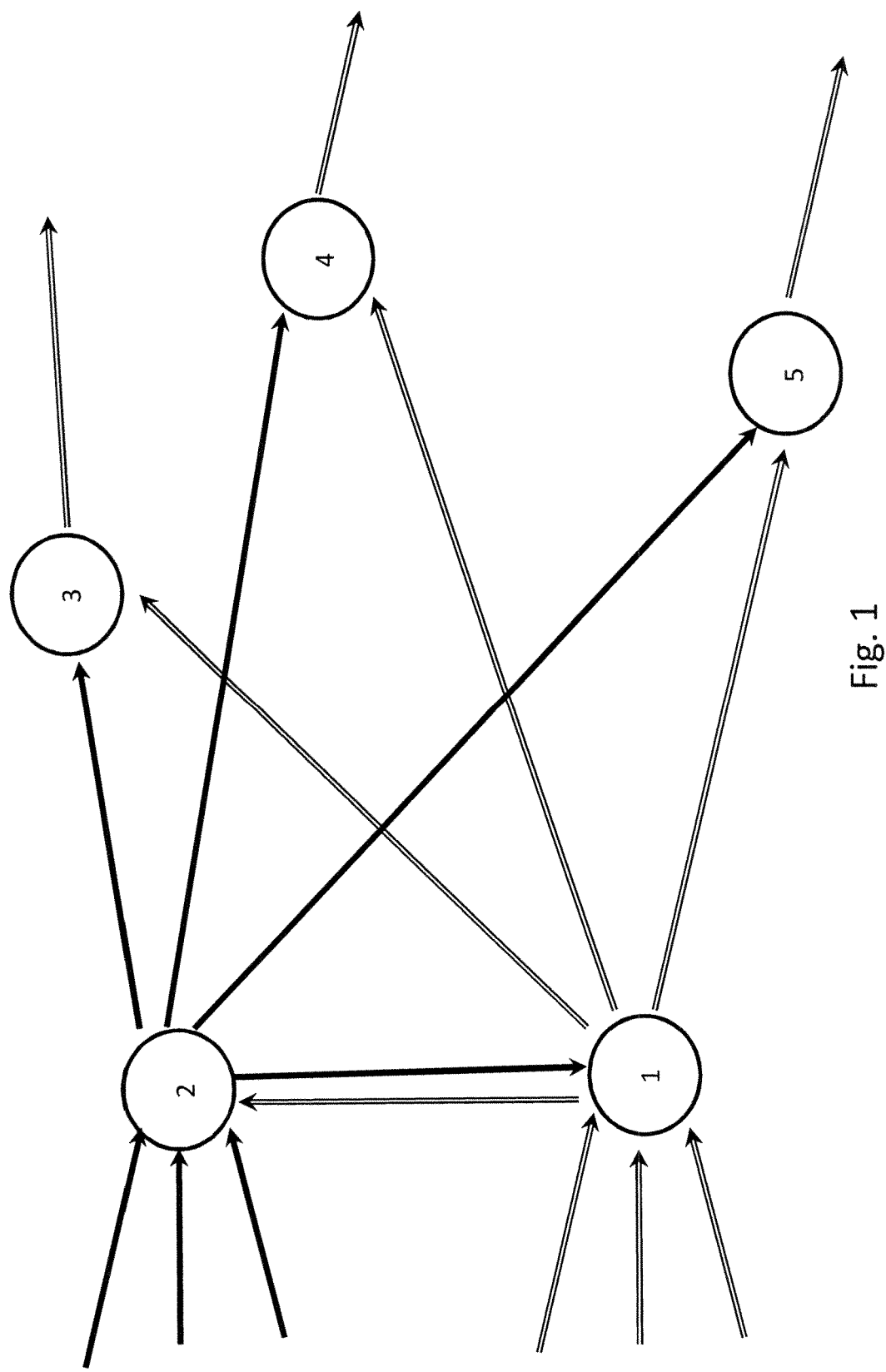
FIG. 1 is an illustration of data flow between nodes according a local decision making model.

The model of local decision making is illustrated in FIG. 1. Node 1 and 2 receives video and audio from their respective sub-nodes. A decision is continuously being taken about which of the incoming audio streams is the loudest. Node 1 and 2 then respectively sends video associated with its loudest speaker to all other nodes. This is also the case for all the other nodes, but for the purpose of clarity, further transmissions from only node 1 and 2 are shown with arrows. Each node may further forward the video from the loudest received speaker to its endpoints.

This model is resilient in case of network failures. Nodes which cannot transmit audio to the recipient are just not added to the list of candidates to mix. No restructuring is required as nodes come on- and off-line; just adding or removing streams is required. On the other hand, this might be very bandwidth consuming, since it requires a full mesh connection between all nodes. This means that the number of connections grows as square of number of nodes, which will severely limit the scalability of the solution.

Figure 2:
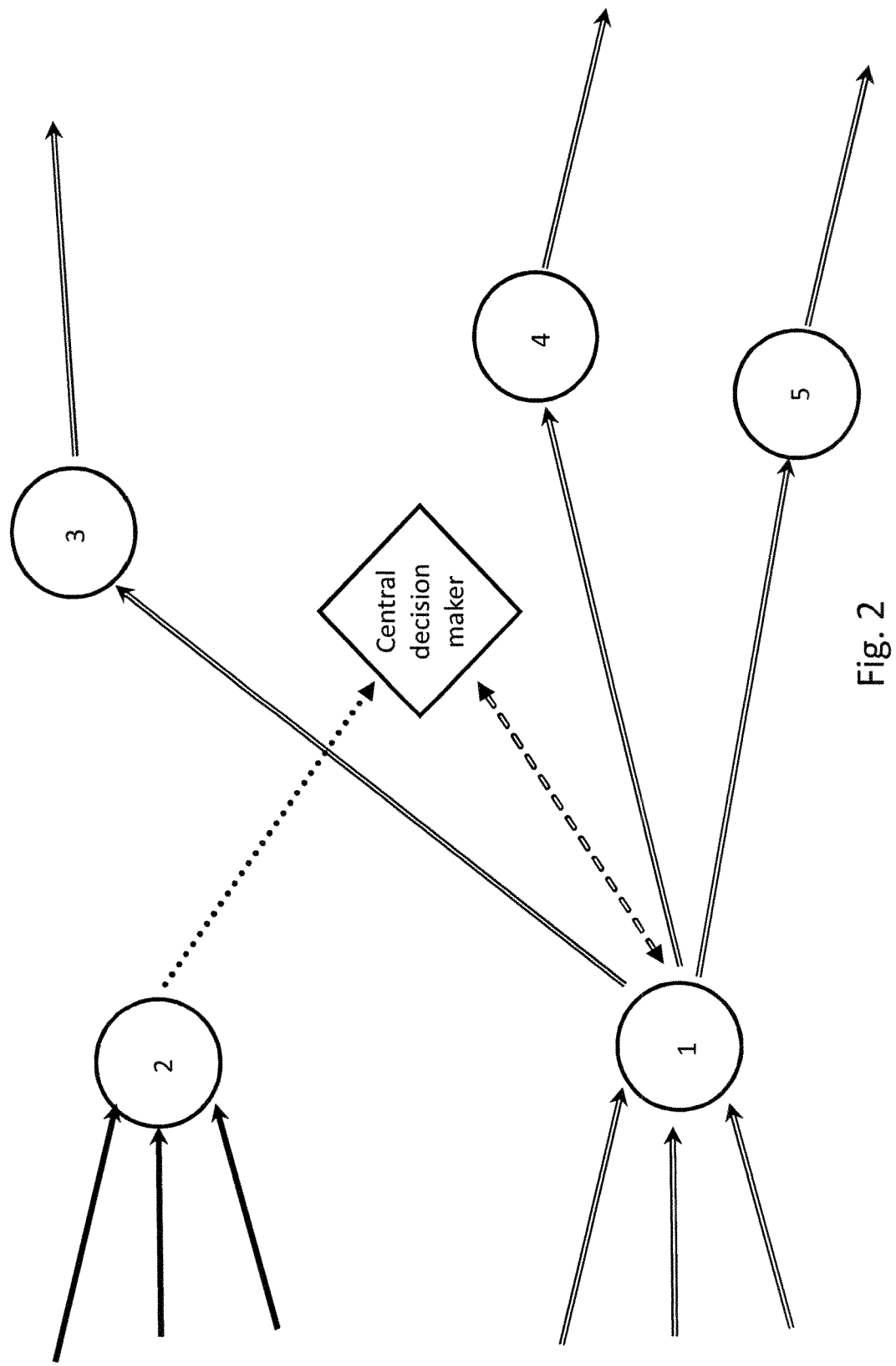
FIG. 2 is an illustration of data flow between nodes according a central decision making model.

An alternative model uses a central decision maker where all streams are sent to a central node which forwards just the N loudest. A decision maker could be a computer process implemented in a computer at a local site making decisions based on data inputs and preprogrammed algorithms. A natural simplification of this is to transmit just the audio power levels to the central point, the central node then directs the node with the loudest reported speaker to transmit video to the other nodes. The recipient nodes receive one stream which they forward to their associated endpoints. This model is illustrated in FIG. 2. Node 1 and 2 receive video and audio from their respective sub-nodes. Node 1 and 2 then send the volume of each respective loudest speaker to a central decision maker. In reality, volume of the respective loudest speaker will be sent from all the nodes, but for simplicity, only the volumes from 1 and 2 are shown in the figure. The decision maker compares the volumes and decides which one is the loudest. In this example, the volume reported from node 1 is the loudest, and hence the decision maker instruct node 1 to forward video of its loudest speaker to node 3, 4 and 5. Each node may further forward the video from the loudest received speaker to its endpoints.

Whilst scaling better than the local decision model, the central decision model has the disadvantage of being extremely fragile in view of network disruption.

According to embodiments herein, a hybrid model of the local decision model and the central decision model is used. Within a single site, where the network is robust, decisions making and media distribution is accomplished according to the local decision model. In addition, the volume of the loudest speaker of each node in a single location is reported to a central decision maker in that location, which is determining with which node the loudest speaker is associated. The central decision makers of multiple locations are further joined in a logical tree structure.

The loudest speaker volumes are reported upwards in the logical tree structure, and the loudest of nodes is instructed to send video to all other nodes participating in the conference.

Figure 3:
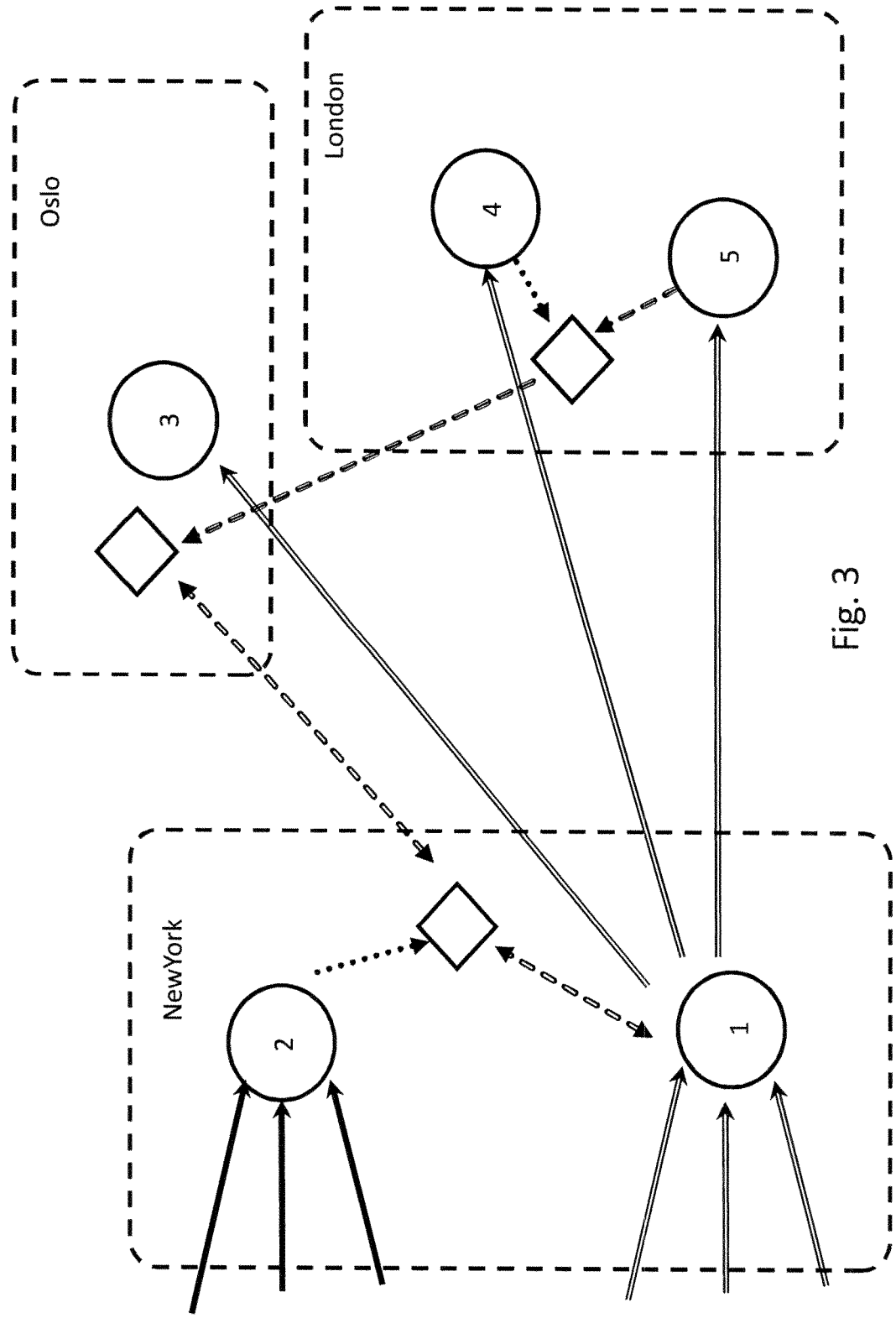
FIG. 3 is an illustration of data flow between nodes according to a logical tree decision embodiment.

FIG. 3 is an illustration of an example according to one embodiment. In this example, there are three sites participating in the conference: Oslo, London and New York. In New York, node 1 and 2 are managing a number of respective endpoints, from which media (video and audio) are received. The volume and identity of the loudest speaker of the respective nodes are reported to a NY decision maker. The NY decision maker is further determining the loudest speaker of the reported ones, and is reporting the result, which in this example is the volume of node 1, to the decision maker in the location of the next level in the logical tree structure, which in this case is the location in Oslo. London is defined at the same level of the logical tree as the location in New York, and is consequently in the same way reporting the volume of the loudest speaker to the decision maker, which in this example is node 5. A decision maker in Oslo determines volume reported from New York to be the loudest, and is therefore sending a feedback to the NY decision maker that the loudest speaker currently are located in NY, managed by node 1. In response to that, the NY decision maker instructs node 1 to transmit the video of the loudest speaker to all the nodes participating in the conference, i.e. to node 3, 4, 5. Each node may further forward the video received to its endpoints.

Figure 4:
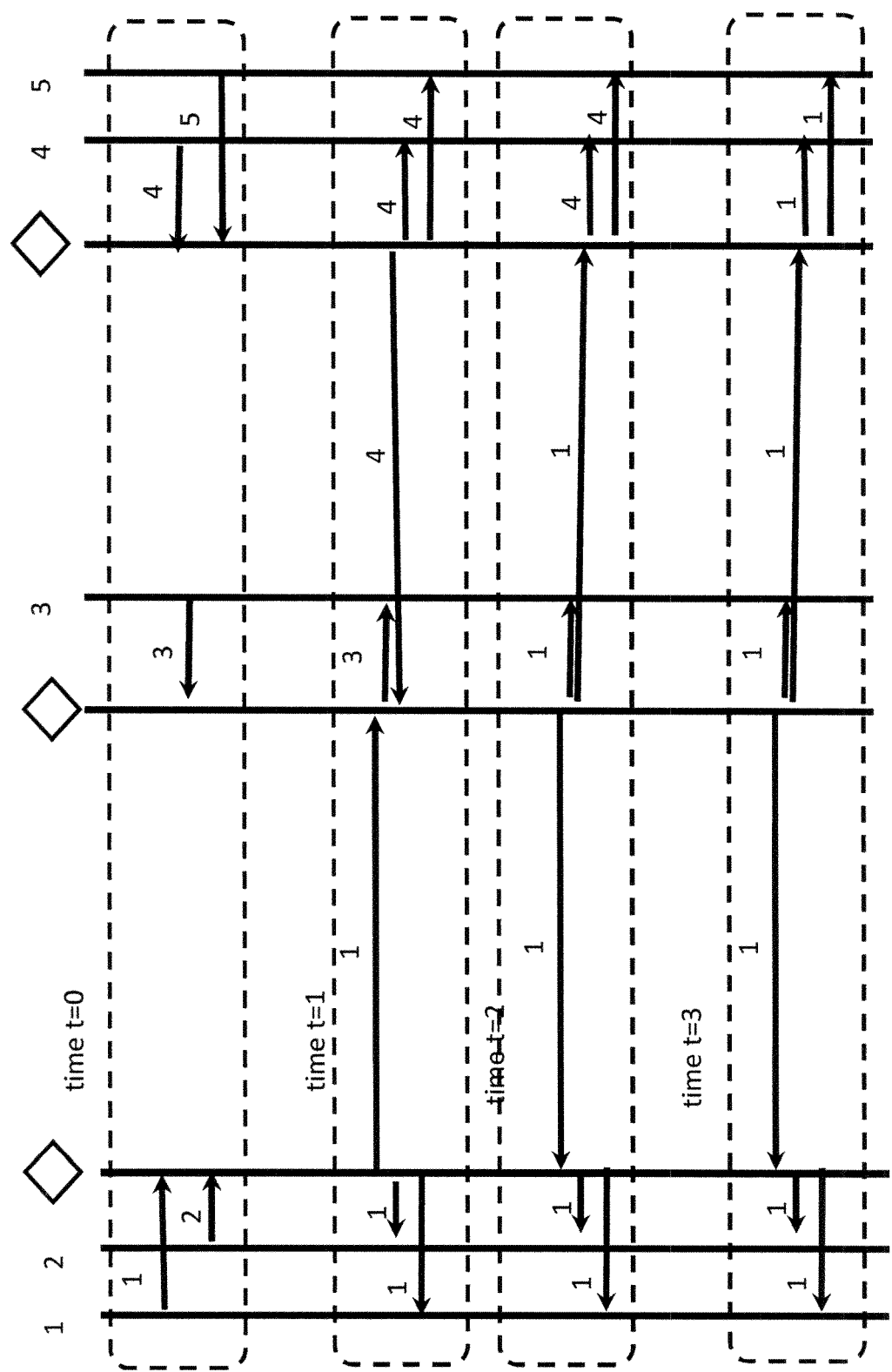
FIG. 4 is a sequence diagram illustrating the data flow between nodes on a time line according to one example embodiment.

FIG. 4 is a sequence diagram illustrating the data flow between the nodes according to the example embodiment discussed with reference to FIG. 3.

There are totally five nodes participating in the conference Nodes 1 and 2 are in New York, node 3 is in Oslo, and node 4 and 5 are in London. The volumes of the loudest speaker of each node are such that 1>2>3>4>5.

At t=0, all the nodes send the volume of the loudest speaker to their respective decision makers, depicted with the symbol ◊. At time 1, all the decision makers report the respective loudest of the previous reported loudest speakers back to the local nodes. In NY, that is node 1, in Oslo that is node 3, and in London, that is node 4. At the same time, the decision makers in NY and London respectively reports node 1 and node 4 as the loudest speaker of their sites to the decision maker in Oslo, which is one level up in the logical tree.

At t=2, the decision maker in Oslo reports to the decision makers in NY and London that node 1 holds the loudest speakers of all the nodes included in the conference. This is further reported internally at the London site at t=3.

The information of the loudest speaker is now propagated throughout the nodes, and node 1 starts transmitting video of the loudest speaker to all the other nodes.

By utilizing a logical decision tree as depicted above, video from the node managing the loudest speaker only has to be transmitted, while still maintaining resilience towards network failures. A network failure between two of the sites will not instantly affect the transmission of video from the loudest speaker to the third site. A network outage between sites will remove one decision node from the tree, dropping its locations media. No specialised recovery process is required. However, a network failure between two sites should result in a reorganization of the logical tree based on predefined priorities of the different sites. For example, London could be moved up in the logical tree if Oslo goes down.

In a further improvement of the embodiments discussed above, a proxy is introduced at each node. Video from the site managing the loudest speaker is then transmitted only to the respective proxies at each site, so as to avoid multiple transmission of the same video to each site. A proxy will then receive and replicate the video to each node at the same site, reducing the number of inter-data transmissions between sites significantly.

Whilst the embodiments discussed above scales as $O(N^2)$ within a location, N in that case is relatively small and so the cost is acceptable. The tree scales as $O(\log N)$, drastically reducing the number of streams required between locations. Network outages in a given location are assumed to be rare given the good network present.

The invention claimed is:

1. A method for managing media streams comprising at least video data and audio data in a multi-party video conference involving one or more groups of one or more nodes respectively receiving a media stream from each of a plurality of associated endpoints comprising:
   determining, in each of the one or more nodes of each of the one or more groups, the loudest audio of the media streams received from the respective plurality of associated endpoints;
   respectively transmitting an indication of the volume of the determined loudest audio and an identification of the node associated with the loudest audio from each of the one or more nodes of the respective one or more groups to a respective decision maker associated with each one or more groups;
   determining, in each one or more decision maker, the highest received volume and the identification of the node associated with the highest received volume; and
   instructing, by a decision maker, the node associated with the identification corresponding to the highest determined volume to transmit the received media stream of the endpoint associated with the determined loudest audio to one of: all nodes in the one or more groups and to a respective proxy associated with each of the one or more groups.

2. The method according to claim 1, wherein each decision maker respectively associated with the one or more group is being assigned to a level of a number of levels in a hierarchy tree structure in which the decision makers are arranged.

3. The method according to claim 2, further comprising:
   transmitting from each one or more decision maker not being assigned to the highest level of the number of levels an indication of the respective highest determined volume and the respective associated identification to the decision maker at the next higher level in the hierarchical tree structure.

4. The method according to claim 3, wherein the decision maker, in the step of instructing, is assigned to the highest level in the number of levels in the hierarchical tree structure.

5. The method according to claim 1, wherein a node is a virtual endpoint, a multimedia server, an MCU, or a sub-unit in a distributed MCU.

6. The method according to claim 1, wherein a node is a sub-unit in a distributed Multipoint Control Unit(MCU); and
   the method further comprising transmitting the received media stream of the endpoint associated with the determined loudest audio to all plurality of endpoints associated with the node.

7. A computer implemented decision maker for managing media streams including at least video data and audio data in a multi-party video conference involving one or more groups of one or more nodes respectively receiving a media stream from each of a plurality of associated endpoints, comprising:
   a receiving means, adjusted to receive, from each of the one or more nodes of the respective one or more groups, an indication of a volume of a respectively determined loudest audio and an identification of a respective node associated with the loudest audio in the one or more nodes of the respective one or more groups;

a determining means configured to determine a highest received volume and the identification of the node associated with the highest received volume; and an instruction means configured to instruct the node associated with the identification corresponding to the highest determined volume to transmit the received media stream of the endpoint associated with the determined loudest audio to one of: all nodes in the one or more groups and a respective proxy associated with each of the one or more groups.

8. The decision maker according to claim 7, wherein the decision maker is assigned to a level of a number of levels in a hierarchy tree structure in which a plurality of decision makers respectively associated with the one or more group are arranged.

9. The decision maker according to claim 8, further comprising:

a transmission means configured to transmit an indication of the respective highest determined volume and the respective associated identification to another decision maker at the next higher level in the hierarchical tree structure.

10. The decision maker according to claim 8, wherein the decision maker is assigned to the highest level in the hierarchical tree structure.

11. The decision maker according to claim 7, wherein a node is a virtual endpoint, a multimedia server, an Multipoint Control Unit(MCU), or a sub-unit in a distributed MCU.

12. The decision maker according to claim 7, wherein a node is a sub-unit in a distributed Multipoint Control Unit (MCU) configured to transmit the received media stream of the endpoint associated with the determined loudest audio to all of its associated plurality of endpoints.

* * * * *